United States Patent [19]

Stocker

[11] Patent Number: 4,658,668

[45] Date of Patent: Apr. 21, 1987

[54] TRANSMISSION KICKDOWN CABLE ADJUSTER

[75] Inventor: Raymond Stocker, West Bloomfield, Mich.

[73] Assignee: Ford Motor Company, Dearborn, Mich.

[21] Appl. No.: 649,110

[22] Filed: Sep. 10, 1984

[51] Int. Cl.$^4$ .............................................. F16C 1/10
[52] U.S. Cl. ................................. 74/501.5 R; 74/502
[58] Field of Search .................. 74/501 R, 503, 527, 74/502, 504, 501.5, 502.4; 403/155, 196, 197, 194, 195, 201; 188/196 R, 196 M, 196 B; 192/111 R, 111 A, 111 B, 111 T

[56] References Cited

U.S. PATENT DOCUMENTS

| | | |
|---|---|---|
| 816,702 | 4/1906 | Bell . |
| 1,841,008 | 1/1932 | Burn ........................... 74/501 |
| 1,927,615 | 9/1933 | Ponti et al. . |
| 2,485,676 | 10/1949 | Thomas ..................... 403/196 X |
| 3,117,466 | 1/1964 | Hinsey ............................ 74/527 |
| 3,206,249 | 9/1965 | Gateley . |
| 3,572,159 | 3/1971 | Tschanz ..................... 74/501 P |
| 3,587,341 | 6/1971 | Fiddler . |
| 3,710,645 | 1/1973 | Bennett . |
| 3,859,866 | 1/1975 | De Grazia ................. 74/501 X |
| 3,984,191 | 10/1976 | Doty ......................... 403/155 X |
| 4,177,691 | 12/1979 | Fillmore .................... 74/501 P |
| 4,331,041 | 5/1982 | Bennett ..................... 74/501 P |

FOREIGN PATENT DOCUMENTS

| | | | |
|---|---|---|---|
| 2522120 | 11/1976 | Fed. Rep. of Germany | 74/501 R |
| 2450373 | 10/1980 | France | 403/197 |
| 836401 | 6/1981 | U.S.S.R. | 74/501 R |

Primary Examiner—Alexander Grosz
Assistant Examiner—Rodney M. Lindsey
Attorney, Agent, or Firm—Frank G. McKenzie; Donald J. Harrington

[57] ABSTRACT

A cable assembly for transferring motion between two pivotally mounted levers includes a mounting bracket for fixing the device against movement, a sleeve formed with grooves or teeth on its outer surface, an adjustment lock mechanism including a clip adapted to engage the teeth on the sleeve, and a spring that resiliently biases the sleeve away from a housing formed with a bore into which the sleeve, a conduit and a cable extend. The cable length is adjusted by applying tension to the cable, which forces the conduit and the sleeve to move in the direction of the tension force. The clip is then moved into engagement with the teeth of the sleeve to fix the length of the cable assembly to a desired length. If one member that is fixed to the cable assembly is prevented from rotating about its pivot in accordance with movement of the cable assembly, an adjustment lock becomes disengaged from its mounting on the housing, thereby permitting movement of the sleeve and conduit in accordance with the requirement movement.

4 Claims, 10 Drawing Figures

TRANSMISSION KICKDOWN CABLE ADJUSTER

BACKGROUND OF THE INVENTION

1. Field of the Invention

This invention relates to an assembly for transmitting motion by a cable moveably supported along a curved or slack path. More particularly, this invention pertains to a device for automatically adjusting the length of the cable assembly and permitting movement of one end of the cable relative to the other end.

2. Description of the Prior Art

Most cable assemblies that transmit motion from one moveable member to another include means adjacent each end of the conduit for attaching a conduit to a support structure and a core element, usually a cable extending from each end of the conduit. Frequently, however, the end of the cable adjacent one of the members connected by the cable assembly does not extend from the conduit a proper amount for attachment. It is desirable to adjust the effective length of the assembly by changing the position of one end of the core element extending from the core after the assembly is installed. The length of the cable extending from the end of the conduit may change by altering the length of the path over which the conduit extends. Usually this path has curves or bends whose lengths are reduced by increasing the length of the conduit that extends between the mount and the cable ends.

However, once the assembly is adjusted, it is usually difficult to release the locking member from engagement with ratchet teeth on a fitting, which is secured to the conduit, in order to reposition or readjust the assembly for repair and maintenance. Another disadvantage of the previous assemblies is that the amount of force with which the ratchet teeth are urged together is not easily controlled, and it is difficult to vary the force among configurations having different requirements.

SUMMARY OF THE INVENTION

It is an object of the present invention to provide a motion transmitting remote control cable assembly that permits the overall length of the assembly to be adjusted automatically after attachment to the moveable members it connects. It is another object of this invention to provide a self-adjusting cable assembly whose length can be readjusted by resetting the position of a moveable member of the assembly and then adjusting the assembly to its proper length.

The cable length adjusting device according to the present invention includes a conduit within which is moveably supported a cable adapted for attachment at each end to moveable members, for example, the ends of pivotably mounted levers on a carburetor and on the kickdown mechanism of an automatic transmission. A housing mounted on a support bracket preferably located adjacent one end of the conduit, defines a bore within which a sleeve member can move longitudinally. The conduit is fixed to the sleeve so that these two members move as a unit through the bore of the housing due to the forces developed in the cable as the levers move about their pivots.

An adjustment lock is releasably supported on the housing and defines a slot within which a locking clip is moved radially inward into engagement with teeth formed on the outer surface of the sleeve. The clip is adapted to engage the teeth and to hold the sleeve in position against the force of a compression spring located between the sleeve and the housing, which resiliently biases the sleeve away from the housing. In normal operation, a lever attached to one end of the cable assembly is moved to an extremity of its travel and the length of the cable assembly is set by moving the locking clip into engagement with the teeth of the sleeve. However, if the opposite end of the cable is prevented from movement in accordance with the movement of the first lever, as for example, if the lever to which it is attached becomes caked with mud or ice or is obstructed by other components, the adjustment lock will disengage the housing and move as a unit with the conduit and sleeve as the lever rotates.

BRIEF DESCRIPTION OF THE DRAWING

FIGS. 4 and 5 are side and front views respectively, of a locking clip used in the assembly of FIG. 1.

FIGS. 6, 7 and 8 are top, side and front views, respectively, of the adjustment lock used in the adjuster assembly of FIG. 1.

FIG. 9 is a side view of the sleeve.

FIG. 10 is a partial cross section showing in detail the form of the serrations formed on the outer surface of the sleeve shown in FIG. 9.

DESCRIPTION OF THE PREFERRED EMBODIMENT

Figure 1:
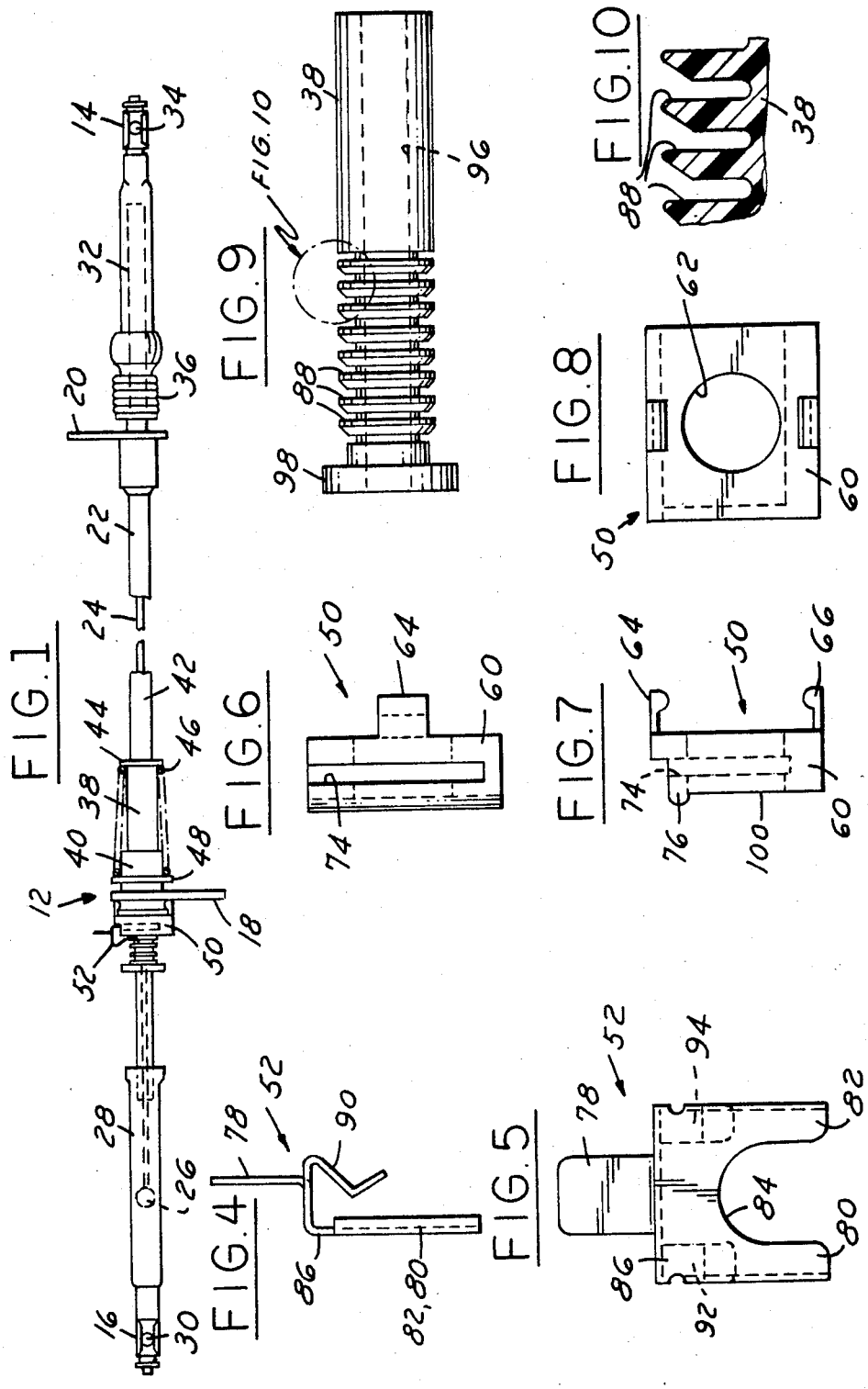
FIG. 1 is a side view of the kickdown cable assembly for an automatic transmission according to the present invention.

Referring first to FIG. 1, the kickdown cable adjuster assembly 12 has one end 14 connected to a pivotable kickdown control lever of an automatic transmission and the other end 16 connected to a pivotable accelerator lever of a carburetor. The cable assembly is installed in the vehicle such that its length is not straight and taut but instead is loose and slack over the portion of its length that extends between mounting flange 18 and the end 14 connected to the transmission kickdown lever.

The cable assembly includes a conduit 22, which moveably supports a cable 24 having a ball whose diameter is larger than the diameter of the cable secured to one end 26 and fitted within a dust tube 28 whose crimped wall forms a blocking surface that prevents withdrawal of the cable from the dust tube. A ball socket 30 is formed integrally with the dust tube and is sized to receive a ball stud located on the carburetor lever. At the other end of the conduit, a dust tube 32 is similarly formed with a ball socket at its end 34 adapted to receive a ball stud located on the kickdown lever of the automatic transmission. A dust boot 36 permits longitudinal movement of the conduit within the dust tube, and a similar blocking arrangement to that described with respect to dust tube 28 prohibits withdrawal of the conduit and cable from dust tube 32.

A sleeve member 38 is fitted over conduit 22 and is located within a housing 40, which is formed integrally with mounting flange 18. At the end of sleeve 38 that is nearest the transmission attachment end 14, a cylindrical metal fitting 42 is joined to the conduit by crimping its outer surface into the soft outer surface of conduit 22 thereby forming an interference engagement between them. Member 42 is formed with an end flange 44 against which one end of a coiled helical compression spring 46 bears. Housing 40 is formed with a flange 48 corresponding to and facing flange 44 against which the opposite end of spring 46 bears. An adjustment lock member 50, supported releasably on housing 40, carries a clip 52, which is adapted to engage the sleeve and to fix the longitudinal position of the sleeve with respect to housing 40.

Figure 2:
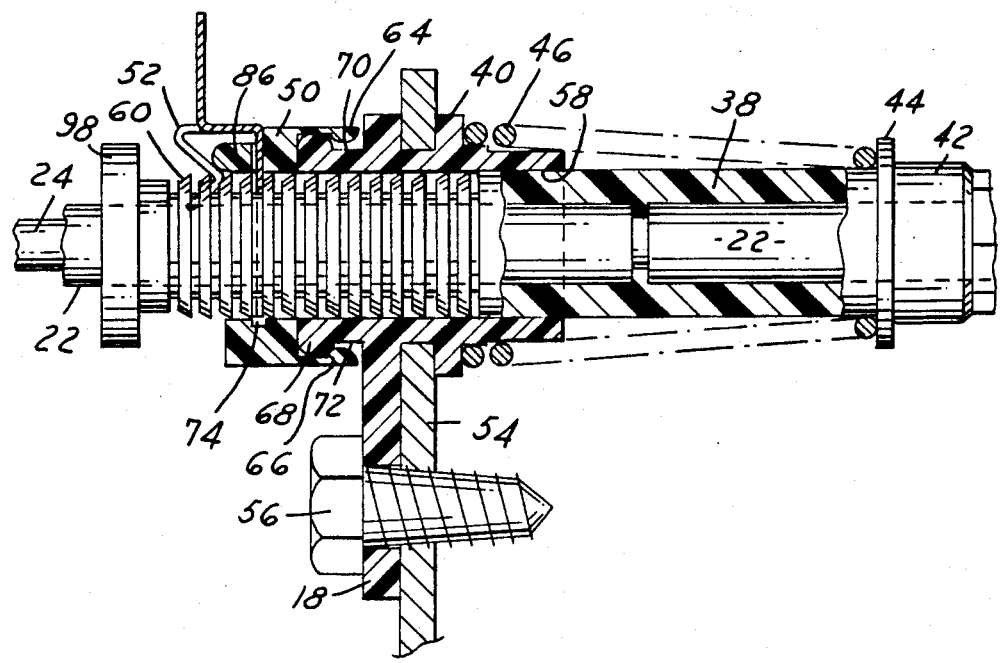
FIG. 2 is a cross section taken along the axis of the adjustment portion of the kickdown cable assembly shown in FIG. 1.
Figure 3:
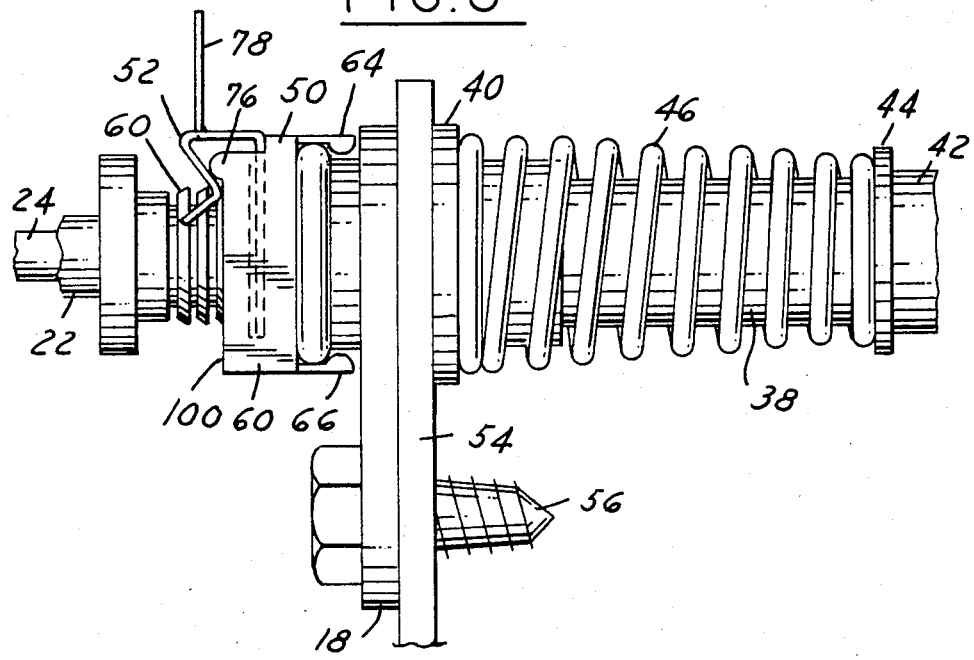
FIG. 3 is an elevational view of the adjustment portion of the kickdown cable adjuster assembly shown in FIG. 1.

Referring now to FIGS. 2 and 3, the cable assembly is fixed in position in the vehicle by a threaded attachment 56 that joins attachment flange 18 of housing 40 and a mounting bracket 54, which is fixed to the structure of the vehicle. Housing 40 has a cylindrical bore 58, into which sleeve 38 is fitted. The sleeve is formed with multiple serrations or teeth at the end located adjacent adjustment lock 50 and clip 52.

The adjustment lock, shown in detail in FIGS. 6, 7 and 8, is made of molded plastic formed with a body of generally rectangular cross section having a central cylindrical bore 62 extending through its longitudinal dimension and sized to receive the sleeve therein. Extending longitudinally outward from the upper and lower surfaces of the body are fingers 64, 66 adapted to reach over a terminal flange 68 formed on the housing and to fit within recesses 70 and 72 on the housing that receive the gripping ends of the fingers therein. The body is formed with a transversely directed slot 74 extending partially through the transverse width of the adjustment lock and sized to receive the flange and the leg of the clip therein. At the longitudinally opposite end of the body 60 from the location of fingers 64 and 66 and extending across the lateral dimension of the body is a bulb portion 76 over which the legs of the clip can be fitted and retained in position.

The clip 52, shown in detail in FIGS. 4 and 5, made from formed sheet metal, is adapted for insertion of its legs 80 and 82 within slot 74 of the adjustment lock. The flange 86 on which legs 80 and 82 are formed has a semi-circular recess 84 sized to fit over the sleeve and between the sleeve teeth so that the adjacent planar portions of flange 86 engage the laterally directed faces 88 of the sleeve, against which it is biased by spring 46. Clip 52 also has two legs 92, 94 extending radially downward and adapted to fit over bulb 76 of the adjustment lock when clip 52 is moved into engagement with the teeth of sleeve 38.

Sleeve 38 has a central cylindrical bore extending through its length adapted to receive conduit 22 therein and is formed with a terminal flange 98 that provides a stop surface against which the end face 100 of adjustment lock 40 is resiliently biased by spring 46.

The cable assembly is installed by attaching mounting flange 18 to mounting bracket 54 and by attaching flange 20 to the vehicle near the transmission control attachment. Next, ball studs on the carburetor throttle lever and on the kickdown lever of the transmission are inserted into ball sockets 30 and 34, respectively. The sleeve is located within the body at a position that brings flange 98 into contact with face 100. In this position, the cable length extending between mounting flange 18 and ball socket 30 is a minimum. Then the throttle lever is rotated to the wide open throttle position, which movement forces conduit 22 and sleeve 38 to move through housing 40 toward the carburetor to the position shown in FIG. 2. This causes the transmission kickdown lever to rotate to its wide-open stop position and spring 46 to compress, thereby permitting sleeve 38 to move relative to housing 40. The slack in the cable length located between flanges 18 and 20 is reduced by this movement. While the carburetor throttle lever is held by the assembly operator with one hand at the wide open throttle position, the other hand is used to insert clip 52 into slot 74 so that it engages the teeth on sleeve 38. This establishes the correct length of the cable assembly between mounting flange 18 and ball socket 30.

The kickdown cable adjustment mechanism of the present invention has the additional capacity to provide overload protection in the event the kickdown lever on the transmission is obstructed, such as by mud or snow packing, from moving freely with the throttle lever as that movement is transmitted by the cable assembly. If the kickdown lever on the transmission is prevented for any reason from moving in accordance with the displacement of the carburetor lever, adjustment lock 50 becomes detached from housing 40, thereby permitting sleeve 38, conduit 22, adjustment lock 50 and clip 52 to move as a unit toward the accelerator when the accelerator pedal is moved toward the wide open throttle position. Later, when the carburetor throttle lever rotates away from the wide open throttle position, the adjustment lock moves with the sleeve and conduit away from the carburetor toward the transmission and into reengagement with housing 40. In this overload protection mode of operation, spring 46 compresses, and additional slack in the cable assembly located between mounting flanges 18 and 20 is reduced.

Having described a preferred embodiment of my invention, what I claim and desire to secure by U.S. Letters Patent is:

1. A cable length adjustment device comprising:
    a conduit;
    a sleeve adapted to receive the conduit therein, fixed to the conduit, having engageable means located along at least a portion of the length of the sleeve;
    a housing for attachment to a support;
    spring means for resiliently biasing the sleeve longitudinally away from the housing and adapted to change in length as the sleeve moves relative to the housing;
    an adjustment lock means releasably connected to the housing for permitting a forceable disconnection of the housing and adjustment lock means;
    locking means mounted on said adjustment lock means for movement into interlocking engagement with said engageable means, whereby movement of the sleeve relative to the adjustment lock means is prevented, and for movement out of engagement with said engageable means, whereby movement of the sleeve relative to the housing is permitted;
    wherein the housing includes a central opening adapted to receive the sleeve therein, a mounting flange for attachment to a support, and mounting surfaces located adjacent the adjustment lock means and wherein the adjustment lock means includes a body portion having a central opening aligned with the central opening of the housing and is adapted to receive the sleeve therein, tabs extending longitudinally from the body portion for releasable connection to the mounting surfaces of the housing and a slot intersecting the central opening adapted to receive the locking means therein, 2. A cable length adjustment device comprising:
    a conduit;

a sleeve adapted to receive the conduit therein, fixed to the conduit, having engageable means located along at least a portion of the length of the sleeve;

a housing for attachment to a support;

spring means for resiliently biasing the sleeve longitudinally away from the housing and adapted to change in length as the sleeve moves relative to the housing;

an adjustment lock means releasably connected to the housing for permitting a forceable disconnection of the housing and adjustment locking means; and locking means mounted on said adjustment lock means for movement into interlocking engagement with said engageable means, whereby movement of the sleeve relative to the adjustment lock means is prevented, and for movement out of engagement with said engageable means, whereby movement of the sleeve relative to the housing is permitted;

wherein the engageable means includes multiple teeth formed on the outer surface of the sleeve, and the locking means includes a clip carried on the adjustment lock means and radially moveable to fit between adjacent teeth, resiliently biased by the spring means against the surface of a tooth to prevent movement of the sleeve relative to the housing; and wherein the housing includes a central opening adapted to receive the sleeve therein, a mounting flange for attachment to a support and mounting surface located adjacent the adjustment lock means and wherein the adjustment lock means includes a body portion having a central opening aligned with the central opening of the housing and is adapted to receive the sleeve therein, tabs extending longitudinally from the body portion for releasable connection to the mounting surfaces of the housing, and a slot intersecting the central opening and adapted to receive the clip therein.

3. A cable adjustment device for transmitting motion between first and second moveable control mechanisms spaced apart from one another comprising;

a motion transmitting member connected at each end to moveable portions of the first and second control mechanism;

a housing for attachment to a support, located between the attachments of the motion transmitting member to the first and second control mechanisms;

a conduit extending at least partially between the attachements of the motion transmitting member to the first and second control mechanisms, adapted to receive the motion transmitting member therein;

a sleeve adapted to receive the conduit therein and fixed to the conduit, having engageable means located along at least a portion of the length of the sleeve;

spring means for resiliently biasing the sleeve longitudinally away from the housing;

an adjustment lock means releasably connected to the housing for permitting a forceable connection of the housing and adjustment lock means;

locking means mounted on said adjustment lock means for movement into interlocking engagement with the engageable means, whereby movement of the sleeve relative to the adjustment lock means is prevented, and for movement out of engagement with said engageable means, whereby movement of the sleeve relative to the housing is permitted; and wherein the housing includes a central opening adapted to receive the sleeve therein, a mounting flange for attachment to a support and mounting surfaces located adjacent the adjustment lock means and wherein the adjustment lock means includes a body portion having a central opening aligned with the central opening of the housing and is adapted to receive the sleeve therein, tabs extending longitudinally from the body portion for releasable connection to the mounting surfaces of the housing and a slot intersecting the central opening adapted to receive the locking means therein.

4. A cable length adjustment device for transmitting motion between first and second moveable control mechanisms spaced apart from one another comprising:

a motion transmitting member connected at each end to moveable portions of the first and second control mechanisms;

a housing for attachment to a support, located between the attachments of the motion transmitting member to the first and second control mechanisms;

a conduit extending at least partially between the attachments of the motion transmitting member to the first and second control mechanisms, adapted to receive the motion transmitting member therein;

a sleeve adapted to receive the conduit therein and fixed to the conduit, having engageable means located along at least a portion of the length of the sleeve;

spring means for resiliently biasing the sleeve longitudinally away from the housing;

an adjustment lock means releasably connected to the housing for permitting a forceable disconnection of the housing and adjustment lock means;

locking means mounted on said adjustment lock means for movement into interlocking engagement with the engageable means, whereby movement of the sleeve relative to the adjustment lock means is prevented, and for movement out of engagement with said engageable means, whereby movement of the sleeve relative to the housing is permitted;

wherein the engageable means includes multiple teeth formed on the outer surface of the sleeve, and the locking means includes a clip carried on the adjustment lock means radially moveable to fit between adjacent teeth, resiliently biased by the spring means against the surface of a tooth to prevent movement of the sleeve relative to the housing; and wherein the housing includes a central opening adapted to receive the sleeve therein, a mounting flange for attachment to a support and mounting surfaces located adjacent the adjustment lock means and wherein the adjustment lock means includes a body portion having a central opening aligned with the central opening of the housing and is adapted to receive the sleeve therein, tabs extending longitudinally from the body portion for releasable connection to the mounting surfaces of the housing and a slot intersecting the central opening adapted to receive the clip therein.

* * * * *